US005601263A

United States Patent [19]
Thayer

[11] Patent Number: 5,601,263
[45] Date of Patent: Feb. 11, 1997

[54] TREE-MOUNTED SPRAY APPARATUS AND METHOD

[75] Inventor: Susan S. Thayer, Winter Haven, Fla.

[73] Assignee: Thayer Industries, Inc., Dundee, Fla.

[21] Appl. No.: 320,303

[22] Filed: Oct. 11, 1994

[51] Int. Cl.$^6$ .................................................. B05B 15/06
[52] U.S. Cl. ........................ 248/75; 248/219.4; 239/273
[58] Field of Search .................................. 248/75, 87, 89, 248/68.1, 219.4, 316.7; 47/48.5; 239/273, 282, 283, 291

[56] References Cited

U.S. PATENT DOCUMENTS

| | | | |
|---|---|---|---|
| 3,746,294 | 7/1973 | Johnston | 248/219.4 |
| 4,010,898 | 3/1977 | Williams | 239/11 |
| 4,138,055 | 2/1979 | Harrison | 248/231 |
| 4,715,571 | 12/1987 | Soltow et al. | 248/68.1 |
| 4,744,537 | 5/1988 | Buckley | 248/219.1 |
| 5,267,412 | 12/1993 | Bergin | 47/48.5 |
| 5,267,695 | 12/1993 | Thayer | 239/566 |
| 5,285,968 | 2/1994 | McSheehy | 239/273 |
| 5,292,014 | 3/1994 | Lelong | 248/218.4 |
| 5,310,151 | 5/1994 | Engel | 248/231 |
| 5,337,986 | 8/1984 | Vollink | 248/218.4 |

Primary Examiner—Alvin C. Chin-Shue
Assistant Examiner—Anita M. King
Attorney, Agent, or Firm—Allen, Dyer, Doppelt, Milbrath & Gilchrist, P.A.

[57] ABSTRACT

A spraying apparatus including an agricultural sprayer and a mounting bracket for affixing the sprayer to the trunk or limb of a tree or bush is disclosed. The mounting bracket is easily adjustable as to height, to radial position about the tree or bush, and to angle between the sprayer and the trunk or limb. This mounting bracket has a base for interfacing with the tree or bush and a connector for adjustably connecting the base with a fastener that encircles the trunk or limb, thus providing height and radial adjustment. The bracket further has a support member that supports the sprayer in spaced relation to the trunk or limb. The support member is capable of assuming a plurality of orientations, thus providing the angular adjustment. A method for spraying trees and bushes is further provided that entails the use of the spraying apparatus, determining a preferred position and orientation of the sprayer, and affixing the sprayer in that position on the tree or bush.

2 Claims, 4 Drawing Sheets

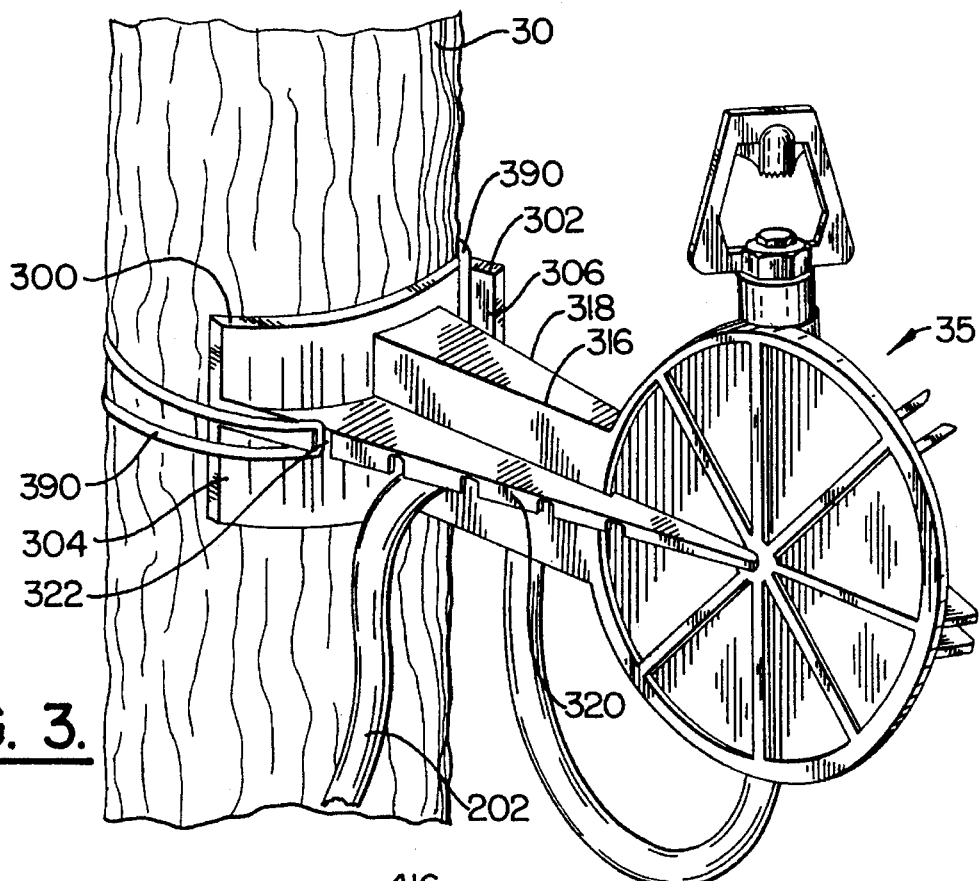
FIG. 3.
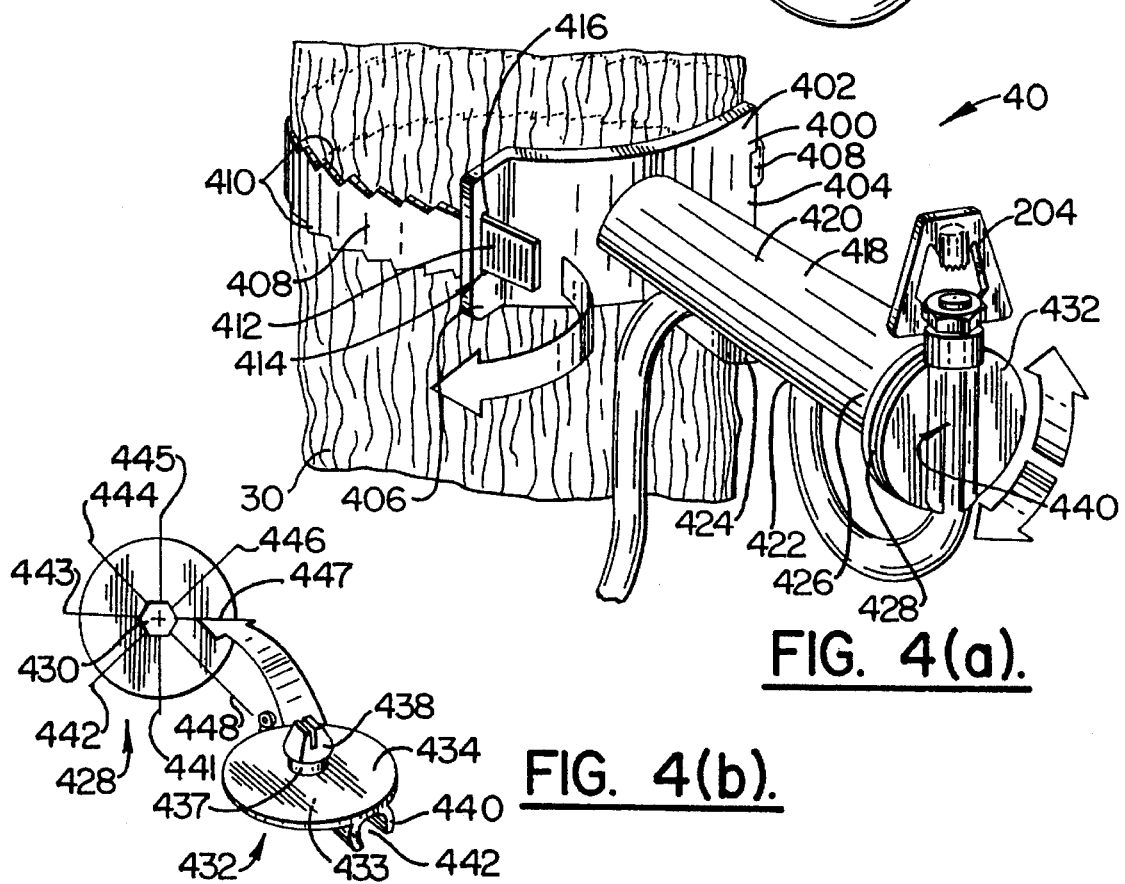
FIG. 4(a).
FIG. 4(b).

TREE-MOUNTED SPRAY APPARATUS AND METHOD

BACKGROUND OF THE INVENTION

1. Field of the Invention

The present invention relates to agricultural sprayers and, more particularly, to apparati for spraying trees and bushes.

2. Description of Related Art

Agricultural sprayers have been known in the art that may be positioned to spray individual trees. One example of such a sprayer is a sprinkler that is mounted on a stake adjacent a tree. The range achieved by this type of sprayer is thus limited by the height of the stake and that achievable by the spray nozzle.

Another type of sprayer, described in U.S. Pat. No. 5,267,695, issued to Thayer, comprises a spray assembly that is suspended from a wire strung above the ground. In such an arrangement, a plurality of assemblies may be suspended over a row of trees and positioned adjacent each tree desired to be sprayed.

There has been a need in the field of agriculture for an apparatus that is directly mountable on a tree and is easily adjustable thereon. A spraying apparatus is also desired whose position once mounted is not subject to environmental conditions such as wind.

SUMMARY OF THE INVENTION

It is thus an object of the present invention to provide a mounting bracket for a spraying apparatus that is easily adjustable both as to height and to angle of the spraying apparatus with respect to the tree or bush to be sprayed.

It is a further object to provide a spraying apparatus that can attain a fixed position with respect to the tree or bush and is not subject to environmental conditions such as wind.

It is another object to provide a method of spraying trees and bushes with an apparatus that is mounted directly on the trees and bushes and is capable of assuming a plurality of orientations relative thereto.

The spraying apparatus of the present invention comprises an agricultural sprayer and a mounting bracket for positioning the agricultural sprayer adjacent foliage to be sprayed. The bracket comprises means for interfacing with a trunk or limb, means for connecting the interfacing means to fastening means for attaching the interfacing means to the trunk or limb, and means for supporting the agricultural sprayer in spaced relation to the interfacing means.

The interfacing and connecting means may comprise a base having means for removably and adjustably coupling with fastening means. The fastening means may include straps having length adjustment means, strips of fabric with Velcro(tm)-type (hook and loop-type) closures, or deformable wires. It may also include a nail that may be hammered into the tree, or the tubing (to be discussed in the following) may serve additional duty as the fastening means by being wrapped around the tree before being passed to the supporting means. The base may have a pair of apertures at a first and a second end dimensioned to permit the fastening means to pass therethrough. Thus, in one embodiment, strips of fabric are threaded through the apertures so that the tree trunk or limb is encircled by the fabric strips and the base, and the bracket is secured with the hook-and-loop type(Velcro(m))-type closure. In addition, the base member may have sufficient flexibility to generally conform to the shape of the tree trunk or limb to which the bracket is to be attached.

The supporting means of the bracket of the present invention comprises in one embodiment a support member having a plurality of securing means dimensioned to engage the agricultural sprayer and positioned to support the agricultural sprayer in a plurality of orientations. This permits the user flexibility in choosing the angle between the sprayer and the trunk or limb. In another embodiment the support member has a securing means that is movable with respect to the base and is capable of assuming a plurality of orientations. This also permits the user flexibility in choosing the angle between the sprayer and the trunk or limb.

Agricultural sprayers typically comprise lengths of tubing, into the ends of which are inserted individual spray nozzles. Thus, in one embodiment, the securing means each comprises means for gripping the tubing so that the nozzles may protrude beyond the bracket and thus not have their spray pattern impeded. The gripping means in the preferred embodiment comprises a channel dimensioned to hold the tubing between a pair of opposed members spaced to closely engage the tubing.

The angle-adjustment feature is provided by disposing the plurality of gripping means radially about the circumference of a generally disk-shaped support member. Further stability may be provided by disposing the channels in generally diametrically opposed pairs so that the tubing may be inserted into two opposed channels simultaneously.

The method of the present invention comprises the steps of providing the agricultural sprayer and mounting bracket as described above; determining a preferred height, radial position, and orientation of the sprayer relative to the trunk or limb; mounting the sprayer on the mounting bracket at a height, radial position, and orientation closest to the preferred orientation; and spraying the tree or bush with the sprayer.

The method may further comprise the steps of: determining a second preferred orientation; mounting the sprayer on the mounting bracket in a second orientation closest to the second preferred orientation; and spraying the tree or bush with the sprayer.

An alternate method may further comprise the steps of: determining a second preferred orientation; moving the support means of the mounting bracket to a second orientation closest to the second preferred orientation; and spraying the tree or bush with the sprayer.

The features that characterize the invention, both as to organization and method of operation, together with further objects and advantages thereof, will be better understood from the following description used in conjunction with the accompanying drawing. It is to be expressly understood that the drawing is for the purpose of illustration and description and are not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 illustrates an alternate embodiment of the mounting bracket having connecting means adapted for using an O-ring as the fastening means.

FIG. 4(a) illustrates an alternate embodiment of the mounting bracket having a rotatable support member. FIG. 4(b) is a detailed depiction of the rotatable support member.

DETAILED DESCRIPTION OF THE PREFERRED EMBODIMENTS

A description of the preferred embodiments of the present invention will now be presented with reference to FIGS. 1–6.

Apparatus for Spraying Trees and Bushes

Figure 1:
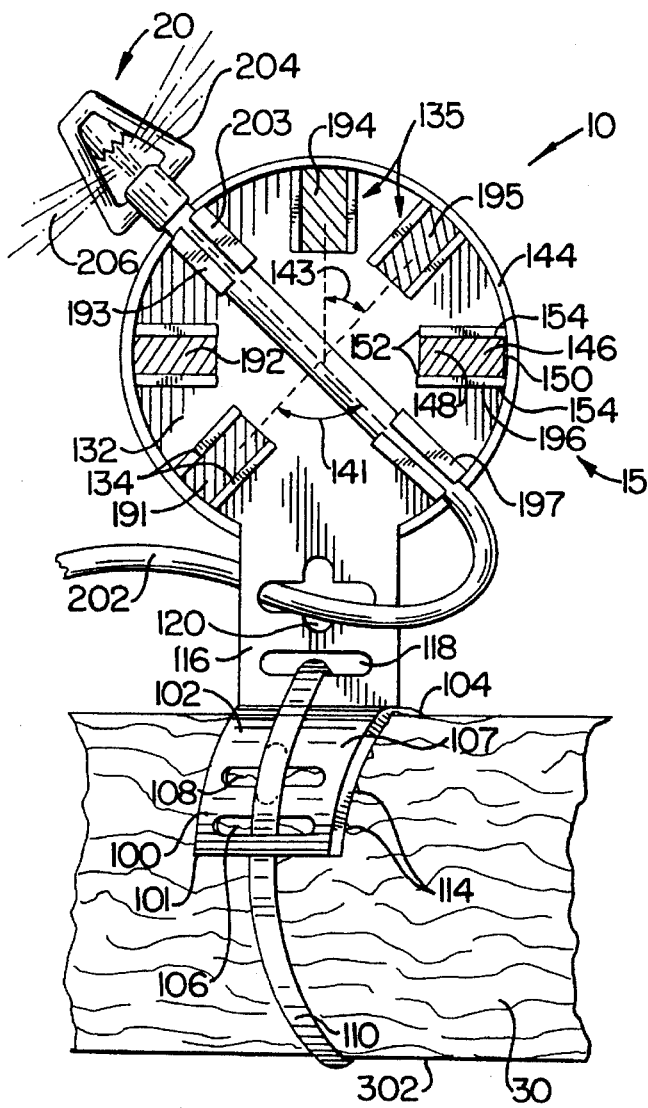
FIG. 1 is a view of the spraying apparatus wherein the mounting bracket is shown normal to the plane of the support member.
Figure 2:
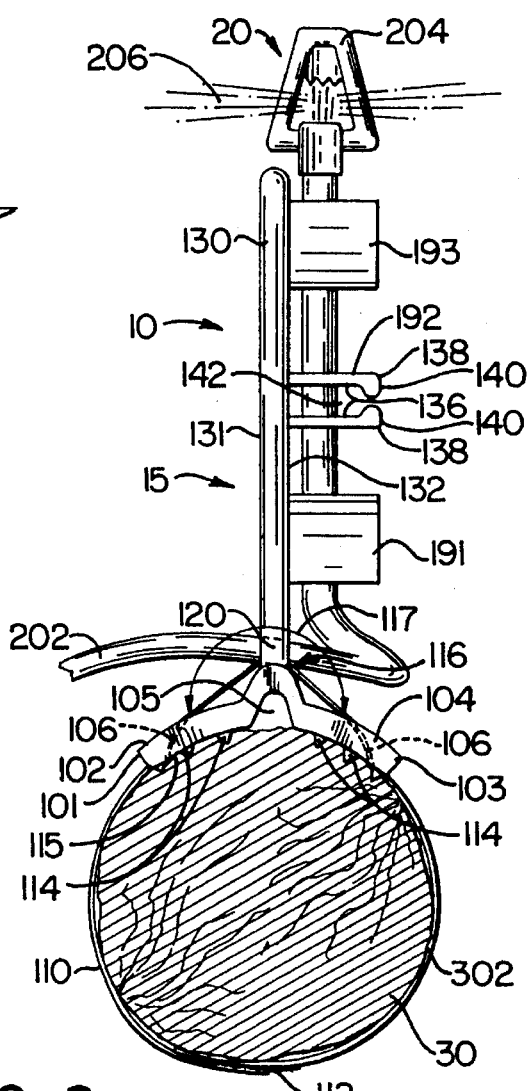
FIG. 2 illustrates the mounting of the bracket in a view down the axis of the tree trunk.

In FIGS. 1 and 2 are shown two views of the preferred embodiment of the spraying apparatus, referred to generally by the reference numeral 10. The mounting bracket of the spraying apparatus 10 is referred to generally by the reference numeral 15. Mounting bracket 15 in the preferred embodiment comprises an integrally molded polypropylene plastic unit designed to be used with an agricultural sprayer 20 of the type comprising a celcowacetal spray nozzle 204 in fluid communication with PVC vinyl tubing 202 through which the fluid to be sprayed 206 is conveyed.

Mounting bracket 15 comprises a base 100 having a first end 102 and a second end 104, each end having two apertures 106 and 108. Mounting bracket 15 is generally rectangular when not under stress. Strap apertures 106, positioned adjacent edges 101 and 103 of first and second ends 102 and 104, respectively, are dimensioned to permit fastening means to pass therethrough. In FIGS. 1 and 2 is shown one type of fastening means that may be used, a strap 110 having closure means comprising a hook and loop (Velcro(tm))-type closure 112 by means of which bracket 15 may be adjustably and removably mounted on a portion of a bush or tree such as a tree trunk or limb 30. Other types of fastening means may comprise a wire tie, a cable tie, a die-cut garbage-bag-type tie, a molded strap, or other fasteners known in the art.

Base 100 further comprises a plurality of protrusions 114 on the side 115 proximal to tree limb 30. Protrusions 114 serve to enhance the anchoring of bracket 15 to tree limb 30. At the center of base 100 is arcuate recess 105, designed to permit additional bending flexibility in base 100.

Figure 5:
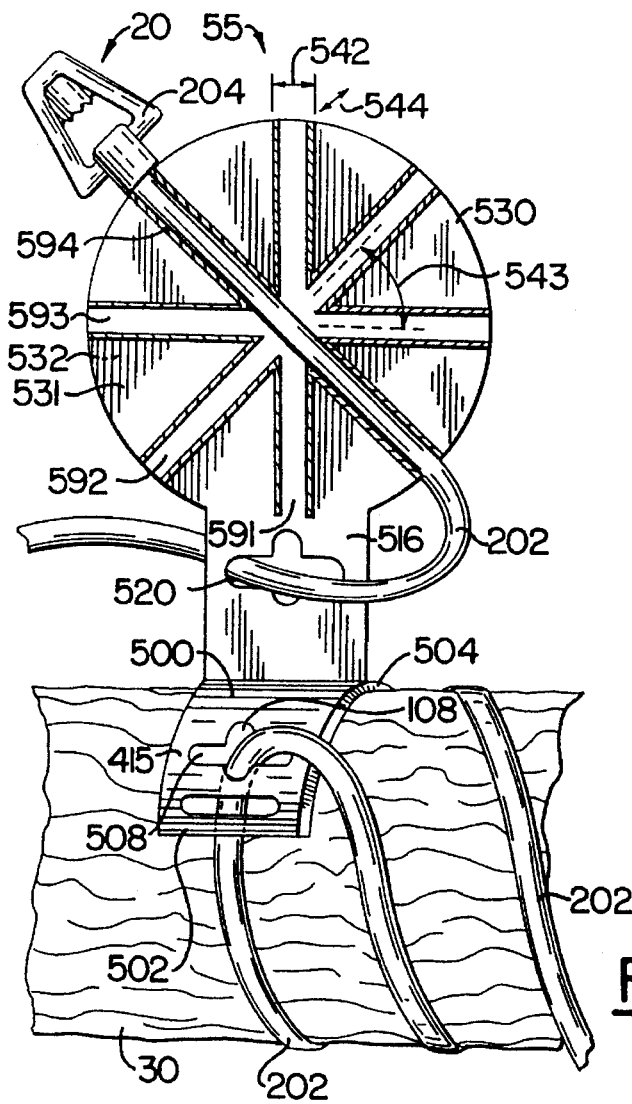
FIG. 5 illustrates an alternate embodiment of the mounting bracket having channels as the gripping means and wherein the fastening means comprises the tubing of the agricultural sprayer.

Tubing apertures 108, positioned between strap apertures and recess 105, are dimensioned to permit tubing 202 of sprayer 20 to pass therethrough (see FIG. 5). The embodiment utilizing these apertures will be discussed below.

The supporting and connecting means comprises a neck piece protruding from the distal side 107 of base 100 in a distal direction, generally bisecting the angle 117 between ends 102 and 104, as shown in the inset to FIG. 2. Neck piece 116 has two apertures therein: Strap aperture 118 is dimensioned to permit the fastening means to pass therethrough; tubing aperture 120 is dimensioned so that the tubing 202 and nozzle 204 of sprayer 20 can pass therethrough. Strap aperture 118 is positioned between tubing aperture 120 and recess 105.

Affixing mounting bracket 15 to tree limb 30 proceeds as follows: Strap 110 is threaded through strap aperture 106 from proximal side 115 of base first end 102, through strap aperture 118, and through strap aperture 106 of second base end 14 toward proximal side 115. The two ends of strap 110 are then wrapped around tree limb 30, and closure 112 is used to affix the ends to each other. In the preferred embodiment, base 100 has sufficient flexibility to conform generally to the shape of tree limb 30 when strap 110 is tightened about tree limb 30.

The supporting means for the agricultural sprayer 20 further comprises a generally disc-shaped support member 130 having a periphery 144, a first side 232, and a second side 131. Support member 130 is positioned distal to neck piece 116 so that it protrudes away from tree limb 30 when mounted. On the first side 132 are the agricultural sprayer securing means, which in the preferred embodiment comprise a plurality of means 135 for gripping tubing 202. The gripping means 135 each comprises a pair of generally rectangular opposed members 134 spaced to closely engage tubing 202. Each member 134 comprises a pair of side edges 152 and 154 generally perpendicular to the plane of the disc; opposing faces 136, and distal edges 138 generally parallel to the plane of the disc.

In the preferred embodiment the plurality of gripping means 135 comprises seven pairs 191–197 of opposed members 134 disposed radially adjacent the periphery 144 of member 130, the pairs of opposed members 134 disposed at an angle 143 of 45 degrees from each other, except for the two pairs 191 and 197 adjacent the neck piece 116, which are separated by an angle 141 of 90 degrees. Thus it can be seen that agricultural sprayer 20 can be supported in seven different orientations.

Member 130 further has apertures 146 defined by opposing faces 136 and imaginary lines 148 and 150 drawn between side edges 152 and 154 of opposing faces 136, respectively, for each set of opposed members 134. The definition of this feature is shown for pair 196.

Opposing faces 136 further have facing protrusions 140 at distal edges 138. Opposed members 134 have sufficient flexibility to permit tubing 202 to be pushed past protrusions 140 into the channel 142 formed by opposing faces 136, protrusions 140, and periphery 144. Channel 142 is dimensioned to permit tubing 202 to be moved in a direction generally parallel to the longitudinal axis 203 of tubing 202, as can be seen in FIG. 1.

As shown in FIG. 1, tubing 202 may be gripped simultaneously by any of three opposing pairs of gripping means 135, wherein each opposing pair is diametrically opposed about periphery 144. These pairs are 191–191, 192–191, and 193–197. By gripping tubing 202 between a pair of gripping means 135, increased stability is attained.

Attachment of agricultural sprayer 20 to bracket 15 proceeds by passing nozzle 204 and tubing 202 through tubing aperture 120 in a direction toward the first side 132 of support member 130. This provides additional stability for the sprayer. A choice of gripping means to be used is made depending on the orientation desired for sprayer 20. Tubing 202 is then pushed into either one or an opposing pair of gripping means 135.

In FIG. 5 is illustrated an alternate embodiment 55 of the mounting bracket utilizing a device similar to that in FIGS. 1 and 2. In this embodiment the tubing 202 also serves as the fastening means. Generally disc-shaped support member 530, having a first side 531 and a second side 532, has as the securing means for the tubing 202 four channels 591–594 radially disposed at angles 543 of approximately 45 degrees in first side 531. The width 542 and depth 544 of each channel 591–594 are dimensioned small enough to hold tubing 202 sufficiently tightly that it will not disengage without being pulled out of the channel, and yet dimensioned large enough that tubing 202 may be pushed into a channel manually.

The method of affixing mounting bracket 55 to tree limb 30 proceeds as follows: Tubing 202 and nozzle 204 are threaded through tubing aperture 508 toward distal side 515 of base 500 first end 502. They are then wrapped around tree limb 30 sufficiently tightly to support bracket 55 and are then threaded through tubing aperture 508 of second base end 504 toward distal side 415. From this point, mounting proceeds with tubing 202 and nozzle 204 being threaded through tubing aperture 520 in neck piece 516 and tubing 202 being inserted into one of the channels 591–594, shown in FIG. 5 to be channel 594.

In FIG. 3 is illustrated an alternate embodiment 35 of the present invention. In this embodiment the interfacing means comprises a generally rectangular base 300 having a first end 302 and a second end 304. The first end 302 has an upturned distal edge 306 dimensioned to hold a flexible circular fastening means such as an O-ring Neck piece 316 in this embodiment protrudes in a generally perpendicular fashion from base 300 and has a first side 318 and a second 320 side corresponding, respectively, to the first end 302 and second 304 end of base 300. Along second side 320 of neck piece 316 is a plurality of notches 322 tilted further than 90 degrees from the plane of base 300. Notches 322 are dimensioned and angled to enable them to hold O-ring 390. Interfacing with a tree limb 30 thus proceeds in this embodiment by looping O-ring 390 around upturned edge 306, passing O-ring 390 about tree limb 30, and hooking O-ring 390 into a notch 322 that will keep the bracket 35 firmly attached to tree limb 30.

In FIG. 4(a) is illustrated a further embodiment 40 of the present invention. In this embodiment base 400 comprises a generally rectangular portion 402 having a first side 404 and a second side 406. To first side 404 is connected a strap 408 having generally sawtooth-shaped sides 410 and a distal end 412 at which there is a pull tab 414. Second side 406 has an aperture 416 dimensioned to permit pull tab 414 and strap 408 to pass therethrough and to lock against the sawtooth last pulled through in a manner similar to garbage-bag ties.

Neck piece 418, protruding from base 400 in a generally perpendicular fashion, comprises a half-cylinder 420 that when mounted has its inner wall 422 facing generally downward. Protruding from inner wall 422 is a hook member 424 dimensioned to hold tubing 202.

As shown in FIG. 4(b), at the distal end 426 of neck piece 418 is a first member having a generally flat face, in this embodiment a first disc-shaped member 428, affixed with the plane of the disc generally normal to the longitudinal axis of half-cylinder 420. Member 428 has a polygonal aperture therein, in this embodiment a central octagonally shaped aperture 430.

In this embodiment the support member comprises a second member having a generally flat face, in this embodiment a second disc-shaped member 432 having a first face 434 and a second 433 face. From first face 434 protrudes a locking piece, which has a polygonally shaped shaft having the same shape as the polygonally shaped aperture of the first member, in this embodiment an octagonally shaped shaft 437 dimensioned to engage aperture 430 and a larger tip 438 having sufficient flexibility to be snap fit into aperture 430. From the second face 436 protrudes gripping means comprising two opposing channel-forming members 440, the channel 442 formed being dimensioned to closely engage tubing 202. The octagonal shapes of aperture 430 and shaft 437 permit relative rotation therebetween, after being disengaged from each other and then re-engaged, thus permitting of agricultural sprayer 20 to assume any of eight positions 441–448 disposed generally 45 degrees from each other, as can be seen in FIGS. 4(a) and (b).

It may be appreciated by one skilled in the art that additional embodiments may be contemplated, including mounting brackets having a supporting means comprising a holder for an agricultural stake, the stake having means of supporting the tubing of an agricultural sprayer and the holder capable of assuming a plurality of orientations relative to the trunk or limb.

Method of Spraying Trees and Bushes

Figure 6A:
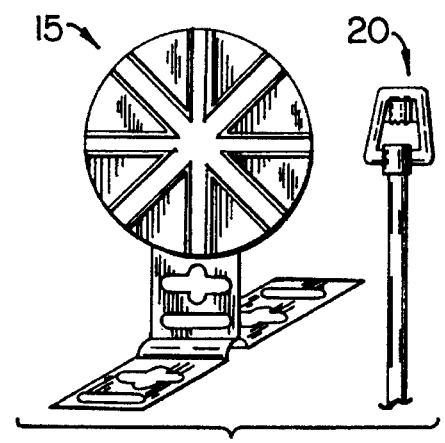
FIGS. 6(a)–(d) illustrates the method of spraying trees and bushes of the present invention utilizing the embodiment of the mounting bracket shown in FIGS. 1 and 2.
Figure 6B:
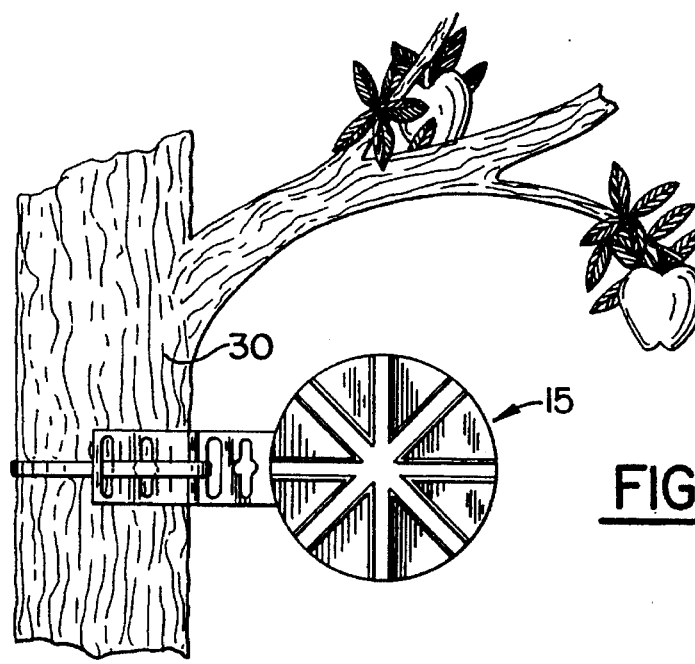
Figure 6C:
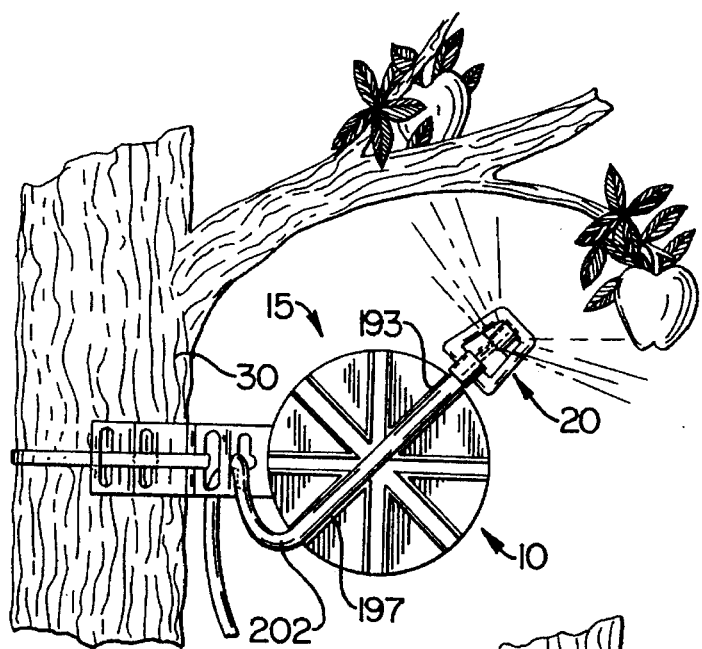

The preferred embodiment of the method of the present invention, shown in FIG. 6, comprises the steps of: providing the agricultural sprayer 20 and mounting bracket 15 as described with reference to FIGS. 1 and 2 [FIG. 6(a)]; determining a preferred height of the sprayer relative to the trunk or limb 30 of the tree or bush to be sprayed; mounting the mounting bracket 15 on the trunk or limb 30 at the preferred height [FIG. 6(b)]; determining a preferred radial position and orientation of the sprayer 20 relative to the trunk or limb 30 of the tree or bush to be sprayed; inserting the tubing 202 of the sprayer 20 into the gripping means 193 and 197 of the mounting bracket 15 in a radial position and orientation closest to the preferred radial position and orientation; and spraying the tree or bush with the sprayer 20.

Figure 6D:
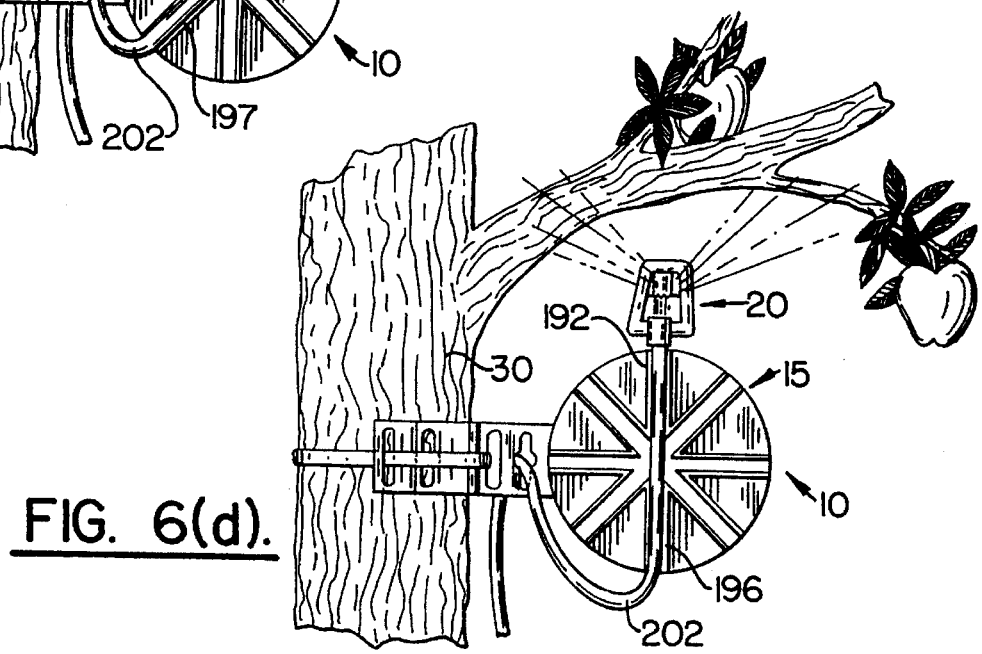

The method may further comprise the steps of: determining a second preferred radial position and orientation; inserting the tubing 202 of the sprayer 20 into a second gripping means 192 and 196 of the mounting bracket 15 in a second radial position and orientation closest to the second preferred orientation [FIG. 6(d)]; and spraying the tree or bush with the sprayer 20.

An alternate method entails the use of the mounting bracket illustrated in FIG. 3. This method comprises the steps of: providing the agricultural sprayer and mounting bracket as described with reference to FIG. 3; determining a preferred radial position and orientation of the sprayer relative to the trunk or limb of the tree or bush to be sprayed; inserting the tubing of the sprayer into the gripping means of the mounting bracket in a radial position and orientation closest to the preferred radial position and orientation; and spraying the tree or bush with the sprayer.

The method may further comprise the steps of: determining a second preferred radial position and orientation; moving the support member by rotating the support member relative to the neck piece of the mounting bracket to a second radial position and orientation closest to the second preferred radial position and orientation; and spraying the tree or bush with the sprayer.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A mounting bracket for positioning an agricultural sprayer adjacent tree or bush foliage to be sprayed, the bracket comprising:

means for interfacing with a trunk or limb of the tree or bush foliage to be sprayed;

means for connecting the interfacing means to fastening means for attaching the interfacing means to the trunk or limb;

means for supporting the agricultural sprayer in spaced relation to the interfacing means and in a plurality of orientations relative to the trunk or limb; and a first member having a generally flat face having a polygonal aperture therein;

the means for interfacing and the means for connecting comprising a base and a neck piece having means for removably and adjustably coupling with the fastening means, wherein:

the base is dimensioned to partially encompass the trunk or limb when the base is affixed thereto;

the base has a proximal side for interfacing with the trunk or limb and a distal side;

the neck piece has a distal end;

the neck piece protrudes from the distal side of the base with the distal end protruding away from the base;

the supporting means are affixed to the distal end of the neck piece;

the first member is affixed to the distal end of the neck piece;

the supporting means comprises a second member having a first face, a second generally flat face, and a locking piece protruding from the second face, the locking piece having:

a polygonal shaft matable with the polygonal aperture; and a tip having a larger diameter than the polygonal aperture but having sufficient flexibility to be snap fit thereinto;

the supporting means further comprises means for gripping tubing of an agricultural sprayer affixed to the first face; and the locking piece is disengagable from the aperture in the first member, the second member is rotatable relative to the first member, and the locking piece is snappable into the aperture in the first member, thereby permitting a supporting of the agricultural sprayer in a plurality of orientations.

2. The mounting bracket recited in claim 1, wherein the first and the second member are generally disc-shaped members, the polygonal aperture comprises an octagonal aperture, and the polygonal shaft of the locking piece comprises an octagonal shaft.

* * * * *